(12) United States Patent
Gale

(10) Patent No.: US 6,773,110 B1
(45) Date of Patent: Aug. 10, 2004

(54) CAMERA STABILIZER PLATFORM AND CAMCORDER THEREFOR

(76) Inventor: Charles H. Gale, 2472 Terrebonne Ave., San Dimas, CA (US) 91773

(*) Notice: Subject to any disclaimer, the term of this patent is extended or adjusted under 35 U.S.C. 154(b) by 0 days.

(21) Appl. No.: 10/622,219

(22) Filed: Jul. 18, 2003

Related U.S. Application Data

(63) Continuation-in-part of application No. 10/607,694, filed on Jun. 27, 2003, which is a continuation-in-part of application No. 10/434,755, filed on May 9, 2003.

(51) Int. Cl.[7] .......................... G03B 17/00; H04N 5/225
(52) U.S. Cl. ...................... 352/243; 396/420; 396/425; 348/211.4; 348/376
(58) Field of Search ................................ 396/421, 420, 396/425, 426; 348/211.99, 211.2, 211.4, 376; 352/243

(56) References Cited

U.S. PATENT DOCUMENTS

| | | |
|---|---|---|
| 2,370,611 A | 2/1945 | Du Mais |
| 4,156,512 A | 5/1979 | Brown |
| 4,208,028 A | 6/1980 | Brown et al. |
| 4,394,075 A | 7/1983 | Brown et al. |
| 4,407,437 A * | 10/1983 | Takubo .................. 224/270 |
| 4,474,439 A | 10/1984 | Brown |
| 4,496,215 A | 1/1985 | Shaheen et al. |
| 4,542,966 A | 9/1985 | Knaudt |
| 4,984,090 A | 1/1991 | Sasaki et al. |
| 5,038,160 A | 8/1991 | Schumacher et al. |
| 5,073,788 A | 12/1991 | Lingwall |
| 5,081,478 A | 1/1992 | Hayashida et al. |
| 5,098,182 A | 3/1992 | Brown |
| 5,128,701 A | 7/1992 | Hampton |
| 5,128,770 A | 7/1992 | Inana et al. |
| 5,317,354 A * | 5/1994 | Kosako .................. 396/59 |
| 5,434,614 A | 7/1995 | Dainty |
| 5,463,436 A | 10/1995 | Shintani et al. |
| 5,579,071 A | 11/1996 | Wetzel et al. |
| 5,742,859 A | 4/1998 | Acker |
| 5,749,011 A | 5/1998 | Nicolaci |
| 6,256,060 B1 | 7/2001 | Wakui |
| 6,262,767 B1 | 7/2001 | Wakui |
| 6,272,290 B1 | 8/2001 | Mogamiya |
| 6,427,034 B1 | 7/2002 | Meis et al. |
| 6,439,515 B1 | 8/2002 | Powers |

(List continued on next page.)

FOREIGN PATENT DOCUMENTS

| | | |
|---|---|---|
| GB | 2103379 A | 2/1983 |
| JP | 3132632 A | 6/1991 |

OTHER PUBLICATIONS

The Zoom CommanderTM, 2002, www.signvideo.com.*
The Mini DV Shoulder Brace, www.studio1productions.com.*

Primary Examiner—Russell Adams
Assistant Examiner—Arthur A Smith
(74) Attorney, Agent, or Firm—Christie, Parker & Hale, LLP

(57) ABSTRACT

A stabilizing platform for attachment to the bottom of the camcorder to steady the filming of subjects with the use of fiber optics positioned along the body of the camcorder to transmit remote control infrared signals to an infrared receiving port on the camcorder. The platform includes a two piece bar that is held together with a locking bolt and includes a mounting screw which attaches the camcorder to the top of the platform and also attaches a handle below the platform. The handle has a locking pin to prevent the handle from rotating with respect to the platform. A remote control is attached to the handle. The remote control also can be imbedded into the handle so that the infrared signal can go from the handle directly into the fiber optics thus giving the user instant control of the signal, and improve the quality of the picture. The fiber optic fibers can be attached along a surface of the platform or along the surface of the camcorder by tape or an adhesive.

20 Claims, 8 Drawing Sheets

U.S. PATENT DOCUMENTS

| | | |
|---|---|---|
| 6,550,471 B2 | 4/2003 | Szymocha et al. |
| 6,559,885 B2 | 5/2003 | Wakui |
| 6,571,043 B1 | 5/2003 | Lowry et al. |
| 2002/0085097 A1 | 7/2002 | Colmenarez et al. |
| 2003/0003993 A1 | 1/2003 | Leifer et al. |
| 2003/0011685 A1 | 1/2003 | Oka et al. |

* cited by examiner

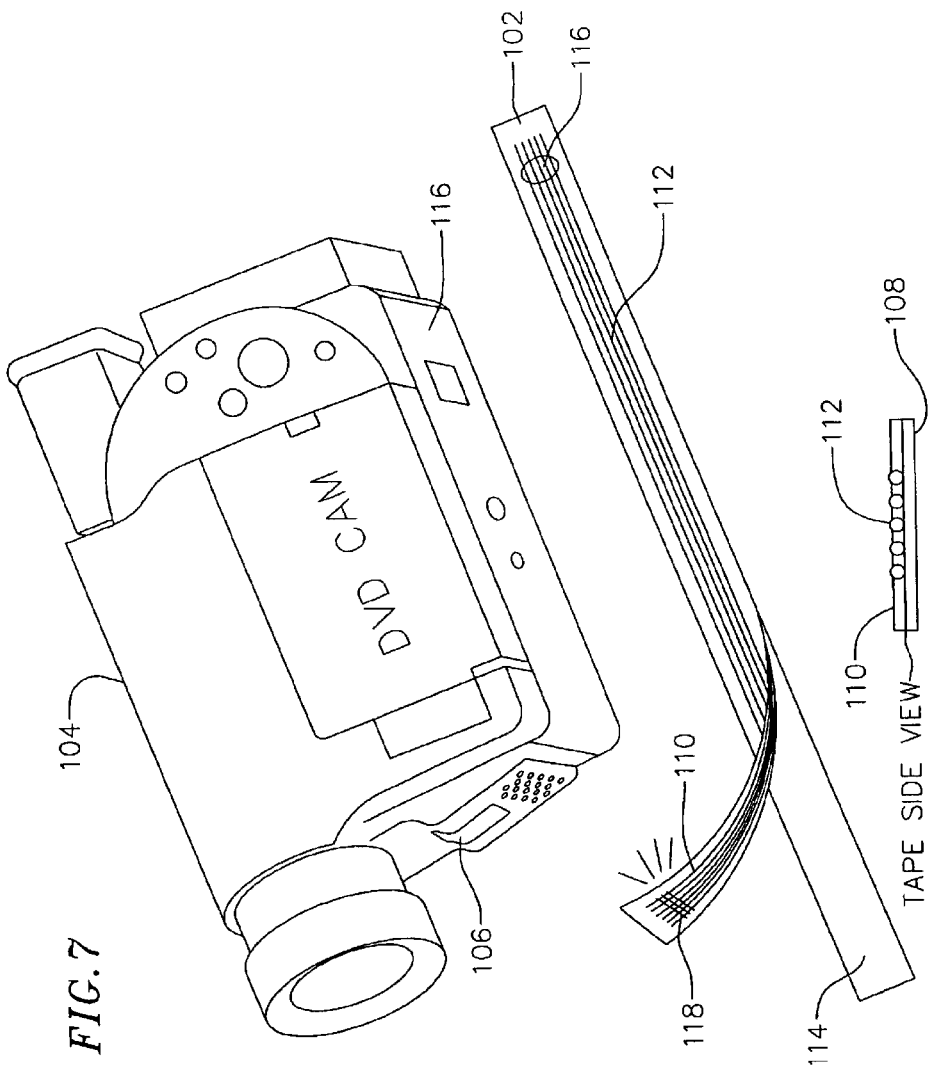

CAMERA STABILIZER PLATFORM AND CAMCORDER THEREFOR

CROSS-REFERENCE TO RELATED APPLICATION(S)

This application is a continuation-in-part of U.S. patent application No. 10/607,694, filed Jun. 27, 2003, which is a continuation-in-part of U.S. patent application No. 10/434,755, filed May 9, 2003.

BACKGROUND OF THE INVENTION

This invention relates to a stabilizing platform support for a camcorder which rests on the shoulder of a camera operator to video subjects thereby eliminating up and down motion normally incurred while filming. The platform has a handle which includes a locking pin for locking the handle into position on the platform.

It is common knowledge that camcorders on the market today due to their small size have an inherent problem of producing a poor quality picture due to hand movement of the user which is not stable thus producing a shaky, unsteady and jittery picture. Even with the stabilizing chip that is present in the camcorder body today does not remedy the jittery movements since a user will video for long periods of time and tire while doing so or walk or run while videoing thus magnifying the problem. Another problem with video camcorders is that the remote control that is typically provided with the purchase of a camcorder, for use with the camera, only operates while the user is directly in front of the camcorder. Operating the camcorder from in front with the remote control is not always practical as the user may be to the side of the camcorder or behind the camera videoing an event without wanting to interject his own presence into the subject. Secondly, if you wish to use a tripod, again, you must be in front of the camcorder to send remote infrared control signals.

Prior attempts have been made to eliminate the unwanted up and down motions typical in amateur videoing or photography through a stabilization mechanism which is either supported by the user's shoulder or by a body harness. None of the prior stabilization mechanisms has a provision for instant, infrared signal control for smooth transition of on and off, power and other functions through a handle that holds the infrared remote control unit. The current camcorder controls require manual manipulation to operate which will create a jittery motion to the image that is being videotaped. The current infrared remote control units that are provided as an accessory to the camcorders on the market today operate only when in front of the camcorder.

U.S. Pat. No. 2,370,611 to Du Mais is a bulky and complicated apparatus with interlocking members which hold a still camera and requires a strap around the arm. This is not practical or helpful for use with the camcorders of today.

U.S. Pat. No. 4,542,966 to Knaudt is a shoulder and hand support for photographic equipment which is supported by an arm connection for rapid picture sequence for a still camera. This support uncomfortably hangs over the shoulder like an arch and comes down to the rib cage and includes many locking mechanisms.

U.S. Pat. No. 4,984,090 to Sasaki et al is a grip that can be mounted underneath a camera. Once mounted and electronically connected there is a power switch of a trigger type that will video only when the trigger is depressed. This is not suitable for long-term video taping. The user must hold this camera with one or both hands and there is no stabilizing attachment reaching to the shoulder which can provide stabilization and comfort and ease in the use of the camera especially for long-term video taping.

U.S. Pat. No. 5,038,160 to Schumacher et al is a camera support apparatus which slides into a compact position. The bar is wider at the front and narrows at the back where it rests on the shoulder. This presents a heavier load in the front causing imbalance and discomfort and is not practical in use. The use of slider plates introduces a potential for pinching or injury to the user.

U.S. Pat. No. 5,073,788 to Lingwall is a cumbersome camera apparatus which requires the use of hinges, straps, fasteners and a body harness to attach to the user for still photography.

U.S. Pat. No. 5,081,478 to Hayashida et al is a tool which attaches to the camera for holding or for carrying purposes which tucks under the camera for compact storage or use as a tripod. In certain instances this device cannot be stored compactly or thinly in the camera bottom portion and it cannot be used as a carrying handle.

U.S. Pat. No. 5,098,182 to Brown is a complicated and cumbersome support system used to stabilize camera equipment for unwanted motions. There are two "struts" which extend from the base support making the device difficult to hold or balance, especially due to the counterbalancing by a secondary view finding device and batteries at the bottom of the first strut.

U.S. Pat. No. 5,128,701 to Hampton is a device having a platform to hold a small video camcorder which provides stabilization for photography by extending the platform to the shoulder. There is no handle to steady the device, only finger grips on each side with which to hold the device causing the user's fingers to be cramped in a bent position to support and steady the camera.

U.S. Pat. No. 5,742,859 to Acker is a support device for stabilizing a camera, particularly a video camera. It has many attachments, struts, pivoting joints with upper yoke, lower yoke, straps for use which make it cumbersome and complicated, especially when the extension pole is introduced for lifting and tilting the camera over and above the user's shoulders or as use of a monopod.

U.S. Pat. No. 5,749,011 to Nicolaci is a stabilizing rod to attach to the bottom of a video camera to steady the picture image. This device would be uncomfortable for use especially for long periods of video taping as well as having inherent personal protection flaws for designing and suggesting this device can be placed against the face and neck.

UK Pat. No. 2,103,379 is a device designed for use of two cameras which are of the still type for simultaneous use. The advantage would be that the user could use two types of film, e.g., black and white for one with color for the other, or slow film for one and fast for the other. The other advantage of this device is that twice the number of exposures can be made per second in an action sequence thus describing the still, 35 mm type camera and is not practical for video cameras.

Japan Pat No. JP403132632 is a device which attaches itself to a video camera serving as a handle with an electronically connected remote control at the bottom of the handle which can also be attached to a tripod. This device will do nothing for stabilization of the picture as one would not have differing results by holding the camera with his hand. The hand is still doing the holding for the only support with the resulting jitter and unwanted movements of the hand.

Consequently a need exists for a camcorder stabilizing platform and camcorder design which addresses the problems of previous designs.

SUMMARY OF THE INVENTION

To address the problems of prior stabilizing mechanisms, the present invention includes a stabilizing platform which attaches to the bottom of a small hand held digital or DVD camcorder with still camera capabilities to steady the filming of subjects. The platform includes a two piece bar that is held together with a locking bolt and includes a mounting screw which attaches the camera to the top of the platform. A handle is attached below the platform. The handle has a locking pin to firmly lock the handle in position on the platform. Fiber optics are incorporated into the body of the platform which are used to send infrared remote control signals to the infrared receiving port in the front of the camcorder. Alternatively a fiber optic tape is applied to the camcorder to direct the infrared signal from the handle to the infrared receiving port on the front of the camera. Further alternatively a secondary infrared port is positioned on the bottom, side or the back of the camera so that the user may be behind or to the side of the camera and able to operate the on, off, stop, zoom in, zoom out, record, pause as well as other functions of the camera. Fiber optic control allows for smooth transitions of the operations of the camera eliminating the jittery motions when manually performing these functions.

It is an objective of this invention to provide a steady and stable support for a camcorder, hand held camcorder, digital hand held camcorder with still camera features or DVD digital hand held camcorder with still camera features. The support facilitates steady recording and then viewing from either the viewfinder or the liquid crystal display screen of the subject thus eliminating the up and down or jittery motion commonly encountered during video recording.

It is also an objective of this invention to provide steady operation and control of the functions of the camcorder with the use of fiber optics. The invention includes fiber optics either imbedded in the platform or in a tape applied directly to a surface of the camcorder for sending signals from the handle to the receiving port in front of camcorder, thereby allowing the use of the infrared remote control from below the camcorder when the user is videoing from behind the camera. The infrared remote control operations eliminates the manual operations such as on, off, zooming in and out, record, pause operations which cause the unsteadiness and up and down motion by manual use. The remote control device is an accessory to all camcorders on the market today, however, the user must be in front of the camera in order to use the infrared remote control which means the user must interject himself into the picture when using the infrared remote control. Consequently the present invention eliminates this problem.

The objectives of the present invention are accomplished by a stabilizing platform which attaches to the underside of the camcorder body and extends to the shoulder of the user for support. The platform includes a two piece bar that is held together with a locking bolt and includes a mounting screw which attaches the camera to the top of the platform and also attaches the handle below the platform. The handle extends from the bottom of the platform and allows the user to hold the handle keeping the unit steady. Within the handle there is a location to attach an infrared remote control device with a double sided Velcro strip. The handle can accommodate all remote control units. The handle also has a locking pin which allows the handle to be firmly locked into position on the platform. Firmly locking the handle in place prevents the handle from moving and assuring that the remote control can direct the infrared signal into the fiber optics through the fiber optic port on the platform.

It is a further objective of this invention to incorporate the infrared remote control unit into the interior of the handle. Another feature of this invention is the elimination of camera operation delay caused by manual operation of the control buttons.

It is a further objective of this invention to provide fiber optics imbedded in the stabilizing platform to send infrared remote control signals from the handle directly into the body of the camera situated above through a secondary infrared receiving port which would be located on the bottom of the camera, just below the handle.

It is a further objective of this invention to provide a fiber optic tape to be applied directly on a surface of the camcorder to direct the infrared signals from the remote control to the infrared signals from the remote control to the infrared receiving port located on the front of the camcorder.

It is another objective of the stabilizing platform to be flexible as it may be adjusted to the user's close up vision as needed. After use, it may be folded into a compact position by loosening the locking knob, removing the handle (with attached remote control) and placing both items into a camera carrying case.

It is further an objective of this invention to provide a lightweight support, easily manufactured with minimal cost to be produced on a mass production basis.

BRIEF DESCRIPTION OF THE DRAWINGS

Other objectives, advantages and features will be apparent from the following detailed illustrations wherein:

FIG. 7 is an exploded perspective view of a video camera and fiber optic tape.

DETAILED DESCRIPTION OF THE INVENTION

Figure 1:
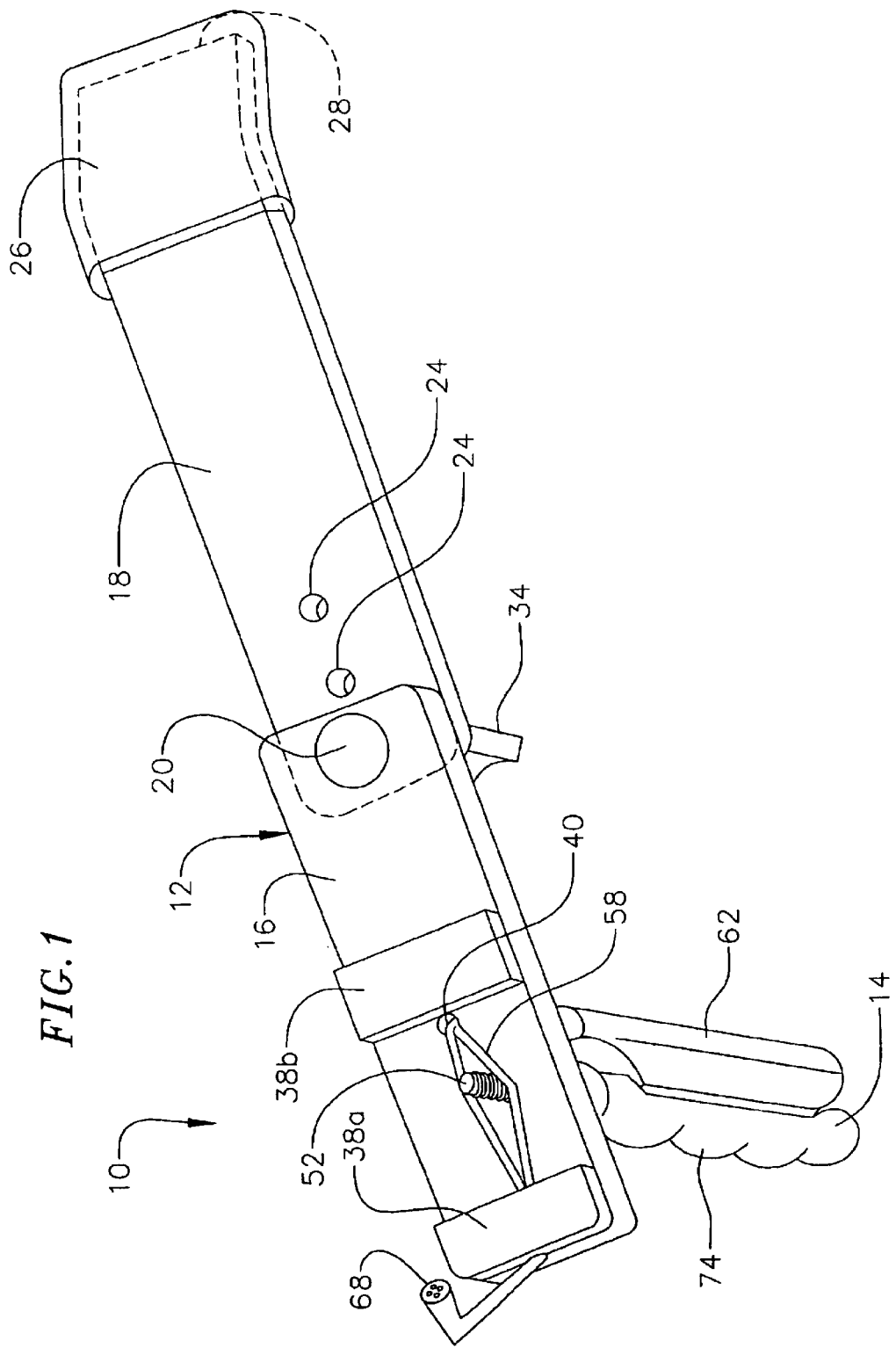
FIG. 1 is a perspective view of a first embodiment of the stabilizer platform of the present invention.
Figure 2:
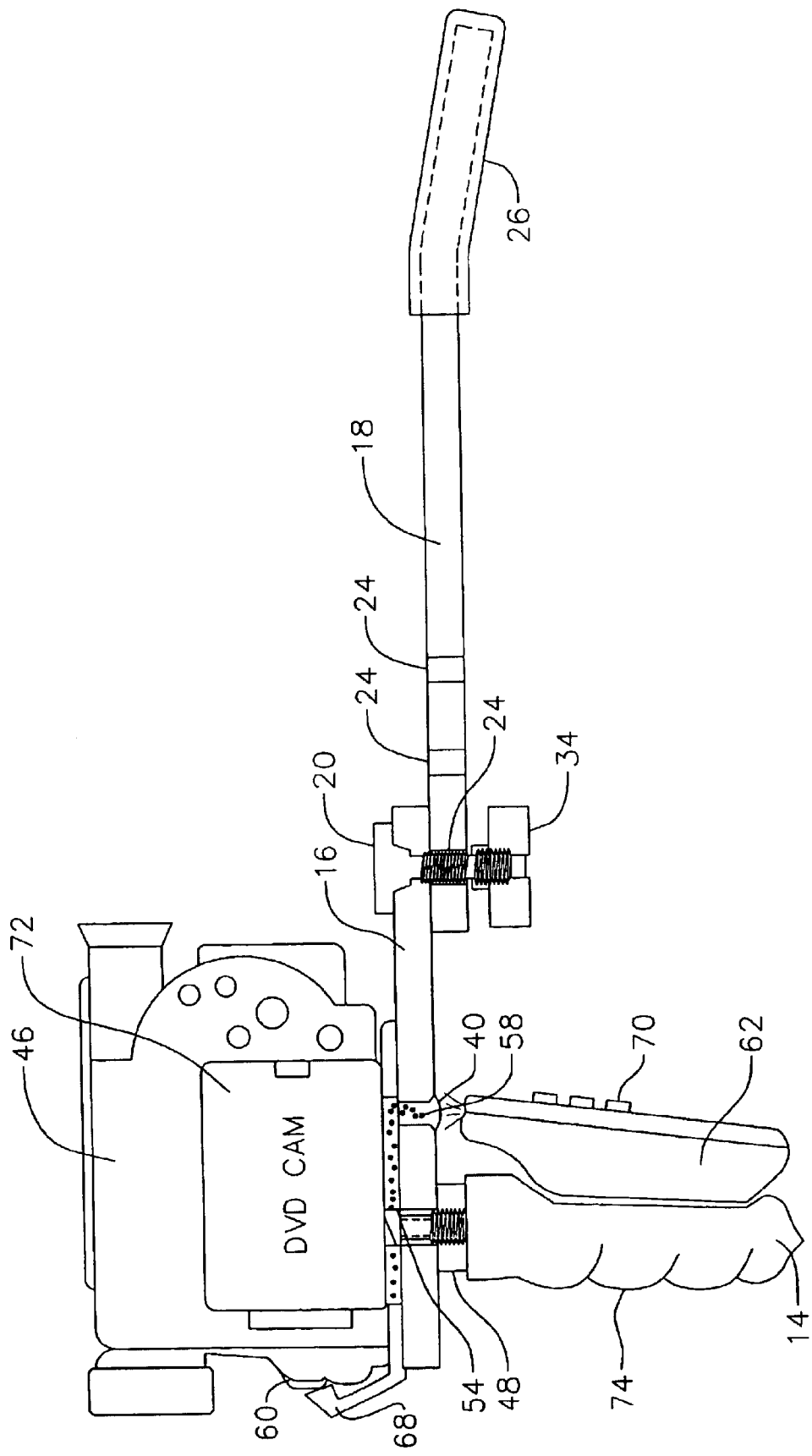
FIG. 2 is a side view of the platform of FIG. 1.
Figure 3:
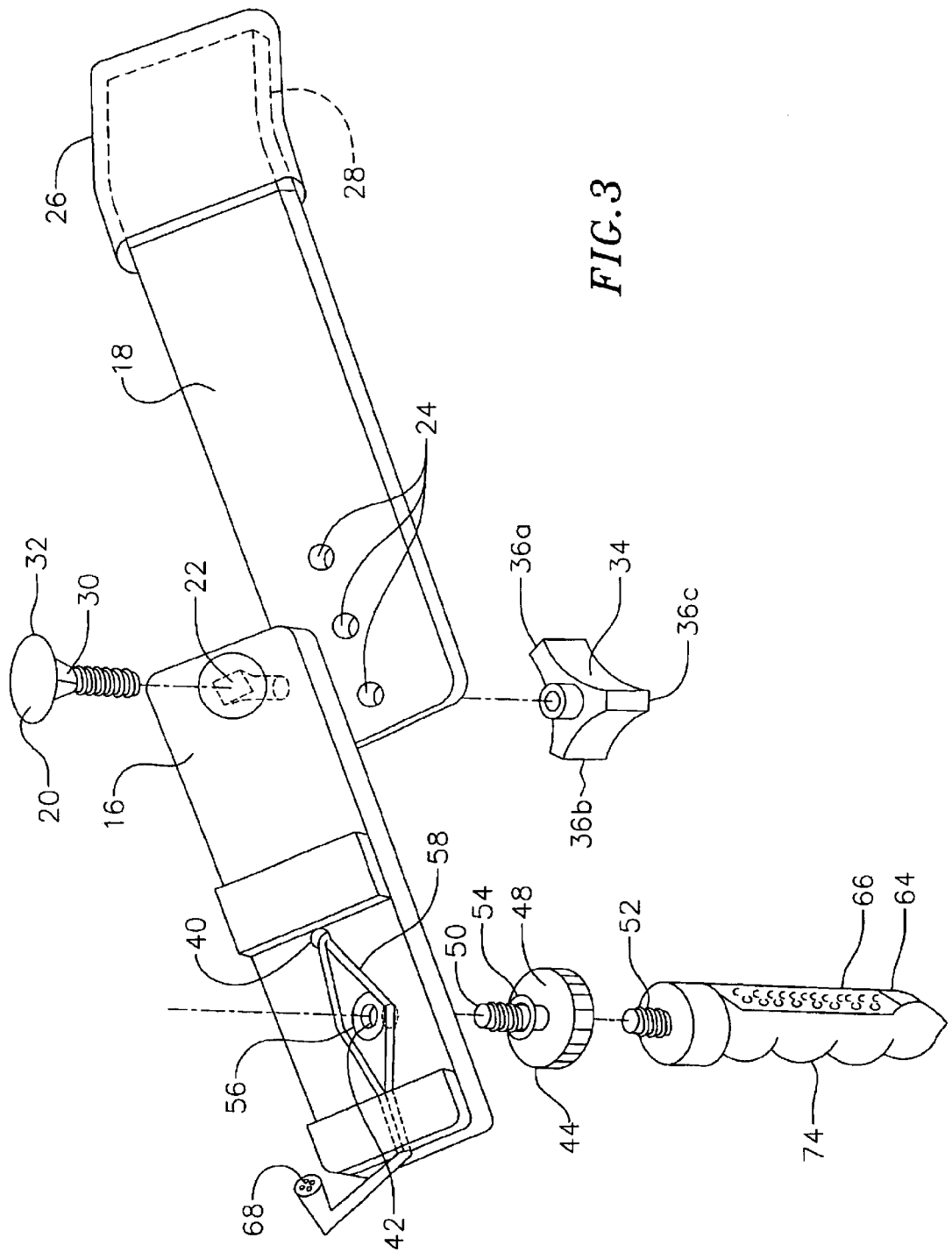
FIG. 3 is an exploded view of the platform of FIG. 1.

As shown in FIGS. 1 through 4, a stabilizer platform 10 of the present invention is shown. The stabilizer platform 10 is for use with a handheld camcorder and comprises a bar 12 and a handle 14. The bar 12 preferably comprises a first section 16 and a second section 18 rotatably connected together by a locking screw 20, which passes through holes 22 and 24 extending through first section 16 and second section 18, respectively. As shown in FIG. 3, hole 24 can be one of a number of holes positioned in second section 18 so that the overall length of bar 12 in the extended position can vary, depending upon the specific user utilizing the invention. A foam pad 26 is positioned on an end 28 of second section 18 opposite from holes 24. Preferably end 28 is bent slightly downwardly and includes pad 26 to rest comfortably on the shoulder of the camera user.

Preferably hole 22 has a square geometry extending at least part way through the width of first section 16 to accommodate the square section 30 on locking screw 20 beneath head 32. Locking screw 20, as previously indicated, passes through holes 22 and 24 and into locking knob 34, which threads onto locking screw 20 and rigidly locks first and second section in its fully extended position. Locking knob 34 is shown as having three flanges 36a, 36b and 36c, which facilitate tightening the locking knob onto locking screw 20 by rotation with the fingers of the user. Although shown with three flanges, locking knob 34 can be other types of knobs commercially available, such circular knobs or any other type of fastening means. As will be discussed in more detail herein, locking screw 20 and locking knob 34 also secure first section 16 and second section of the stabilizer bar 12 in a stowed position.

Positioned on the upper surface of the first section 16 of the stabilizer bar are camera pads 38a and 38b, which preferably are made of foam rubber and include a pressure-sensitive adhesive to keep the camera pads in position on the upper surface of the first section. Camera pads 38a and 38b provide a cushion and friction attachment point for the video camera on the upper surface of the first section. First section 16 further includes a fiber optics port 40, which essentially is a hole extending through the first section. First section 16 also includes a camera hole 42 extending through the section for receipt of a camera screw 44, which is used to attach the handle 14 below the first section, as well as the video camera 46 to the upper surface of the first section. The camera screw 44 includes a circular body section 48 and a threaded pin 50. The body section 48 includes a threaded bore for threaded engagement of a threaded pin 52 positioned on the end of the handle 14. As seen best in FIG. 2, camera screw has the pin 52 of the handle threaded into the bore and the camera screw threaded pin 50 is inserted through hole 42 in the first section. A retaining ring 54 is then positioned over pin 50 and into recess 56 on the upper surface of the first section to hold the camera screw firmly in place on the first section. The threaded pin 50 then extends up above the upper surface of the first section 16 and is threaded into a threaded tripod hole positioned on the bottom of the camcorder 46.

A fiber optic cable 58 extends through fiber optic port 40 and around bore 42 to the front of first section 16. The cable then extends upwardly and rearwardly so that fiber optic signals can be transmitted from below the first section 16 to an infrared receiving port 60 typically located in the front of the camcorder 46. The fiber optic cable 58 transmits infrared signals from a remote control 62 attached to handle 14 and positioned below the first section 16. Handle 14 includes a flat surface 64 containing hook and loop fastener 66, one-half positioned on flat surface 64 and the opposite half positioned on the bottom of the remote control. It is to be understood that other forms of fastening of the remote control to the handle are possible, such as adhesives, double-sided tape, etc. Fiber optic port 40 is positioned along the first section 16 such that, when the remote control 62 is attached to handle 14, infrared signals can be transmitted to the infrared receiving port 60 by fiber optic cable 58. Fiber optic cable 58 is of sufficient rigidity that it can be bent into the necessary position to transmit the signal, or it can be a more flexible cable, which would then be positioned within a housing or shield 68 attached to the front of the first section 16.

As shown best in FIG. 2, during operation, the user operates the video camera 46 through the controls 70 on the remote control 62, which sends an infrared signal through fiber optic cable 58 to receiving port 60. The activity being recorded by camcorder 46 can be seen in the Liquid Crystal Display (LCD) view screen 72. Shoulder pad 26 rests on the shoulder of the user, and handle 14 includes finger grips 74 to be grasped by the hand of the user. The combination of the hand of the user, by holding onto the handle, and the second section 18 resting on the shoulder of the user, both stabilizes and operates the camcorder while recording.

Figure 4:
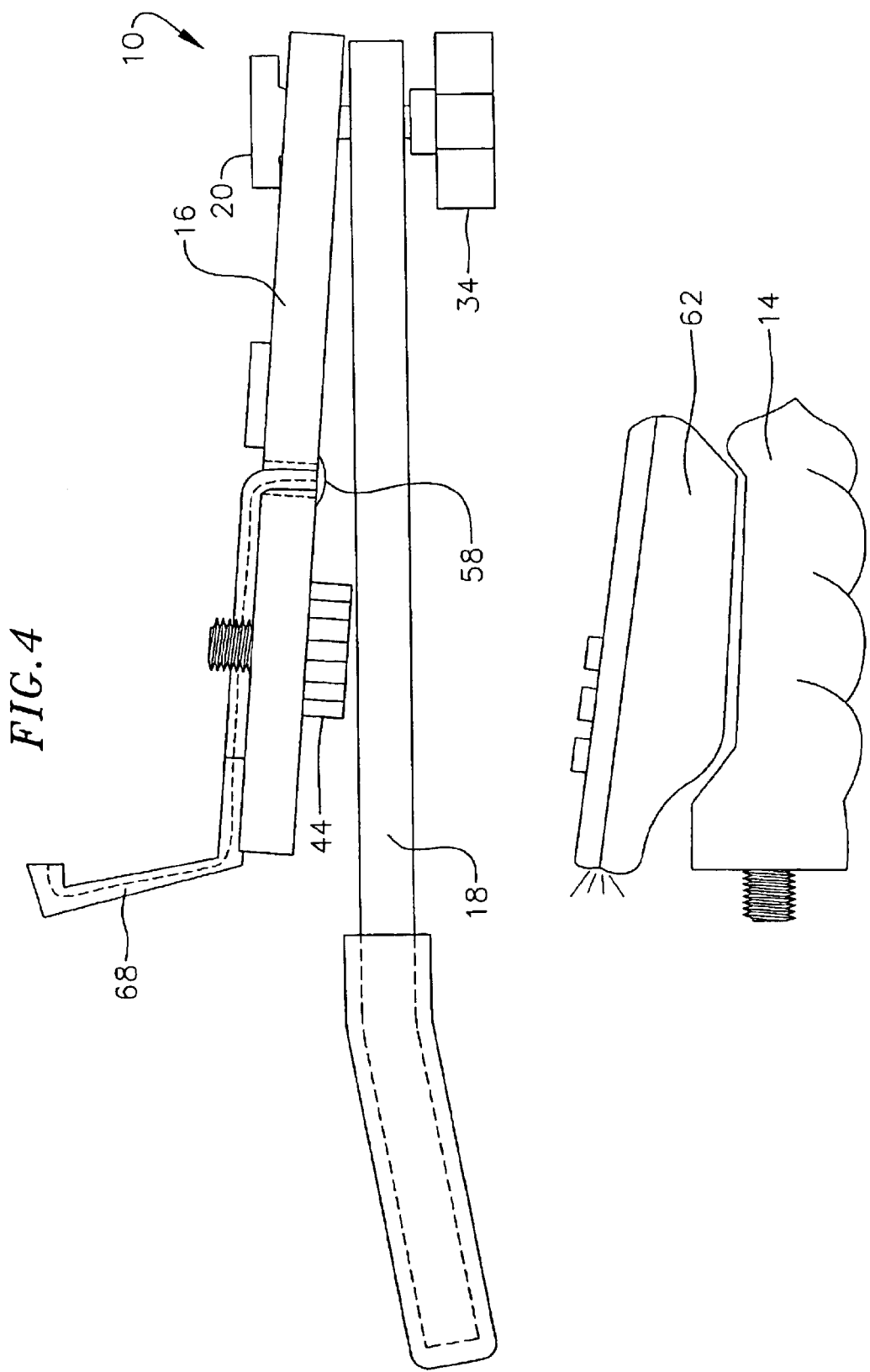
FIG. 4 is a side view of the platform of FIG. 1 in a collapsed position.

As seen best in FIG. 4, the stabilizer platform 10 of the present invention can be easily disassembled and stowed in a compact position. The handle 14 is unscrewed from the camera screw 44, and the remote control 62 can remain attached to the handle or removed. The locking knob 34 and locking screw 20 can be loosened so that the first section 16 and second section 18 can be rotated to a collapsed position. The length of the invention is then half the size and can be conveniently stored in a video camera bag. The first and second sections 16 and 18 of the invention may be constructed from any type of material ranging from lightweight aluminum, carbon fiber or plastics, depending upon economic factors, use factors or manufacturing limitations.

Figure 5:
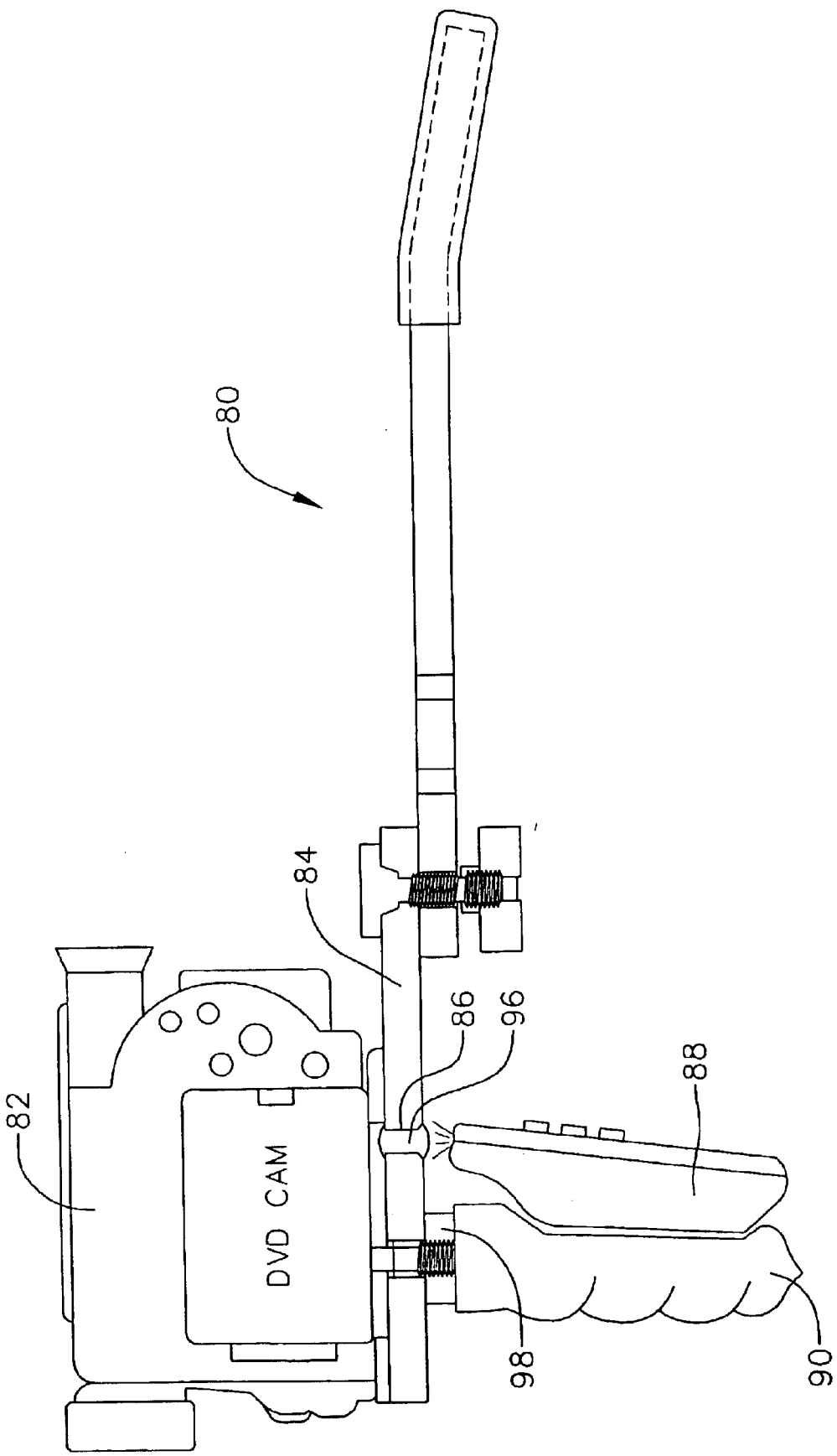
FIG. 5 is a side view of a second embodiment stabilizer platform of the present invention.
Figure 6:
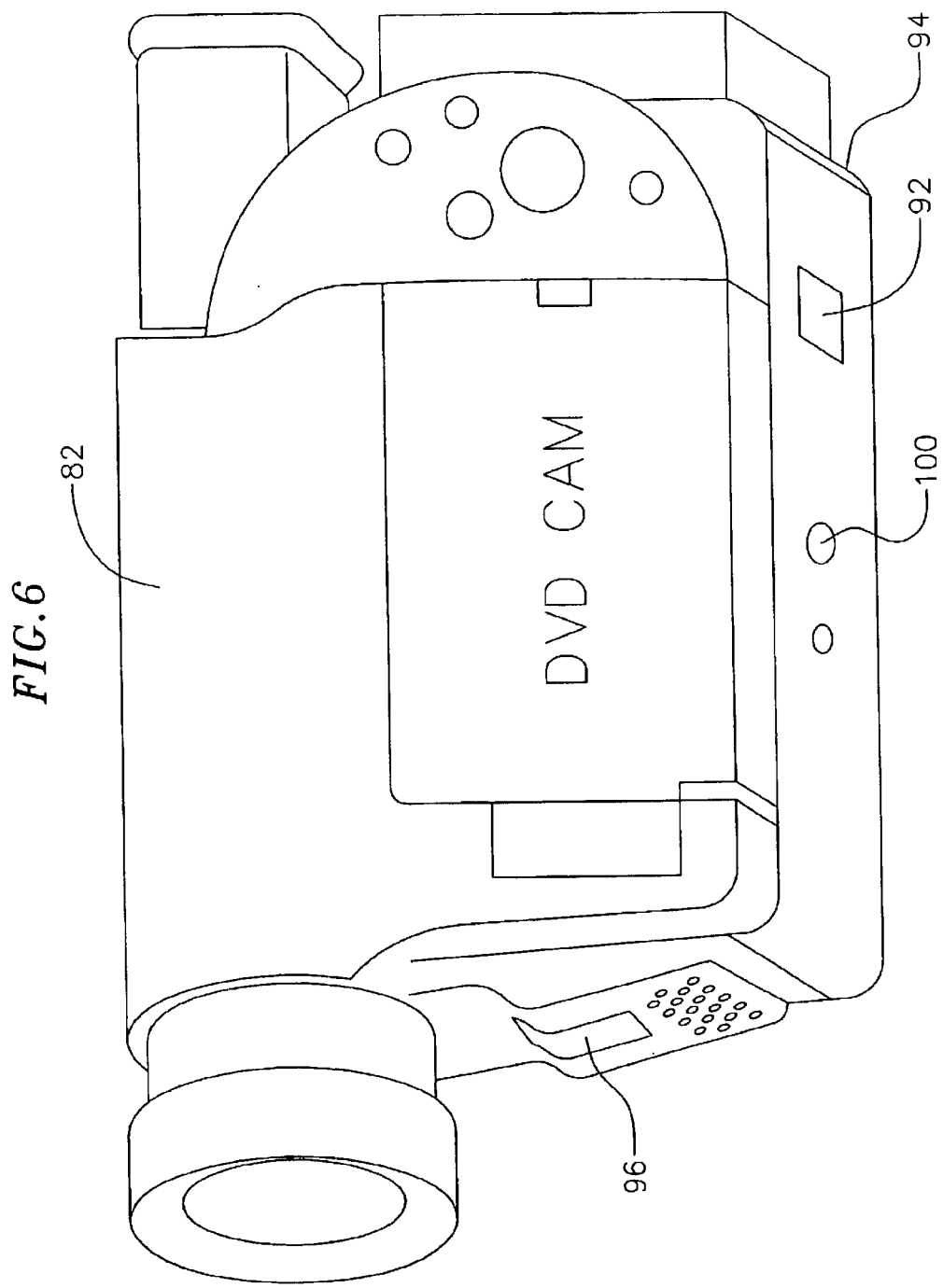
FIG. 6 is a perspective view of a video camera for use with the platform of FIG. 5.

FIG. 5 illustrates an alternative embodiment stabilizer platform 80 of the present invention for use with camcorder 82 shown in FIG. 6. In this embodiment, stabilizer platform 80 is nearly identical to platform 10 shown in FIGS. 1 through 4, however, no fiber optic cable is necessary. In this embodiment, first section 84 includes an infrared port 86 positioned so that infrared signals transmitted from remote control 88 attached to handle 90 would be received by an infrared receiving port 92 positioned on a bottom surface 94 of camcorder 82. Alternatively, although not necessary, a short piece of fiber optic cable 96 can be positioned in infrared port 86 to assist in transmitting the infrared signals to receiving port 92. For this embodiment, camcorder 82 could have an infrared receiving port 92 on a bottom surface as well as a receiving port 96 positioned on the front of the camera, as traditionally done. In this embodiment, the camera screw 98 would secure the video camera 82 on top of first section 84 by threading into the threaded tripod bore 100 also positioned on the bottom of the camcorder.

Figure 5A:
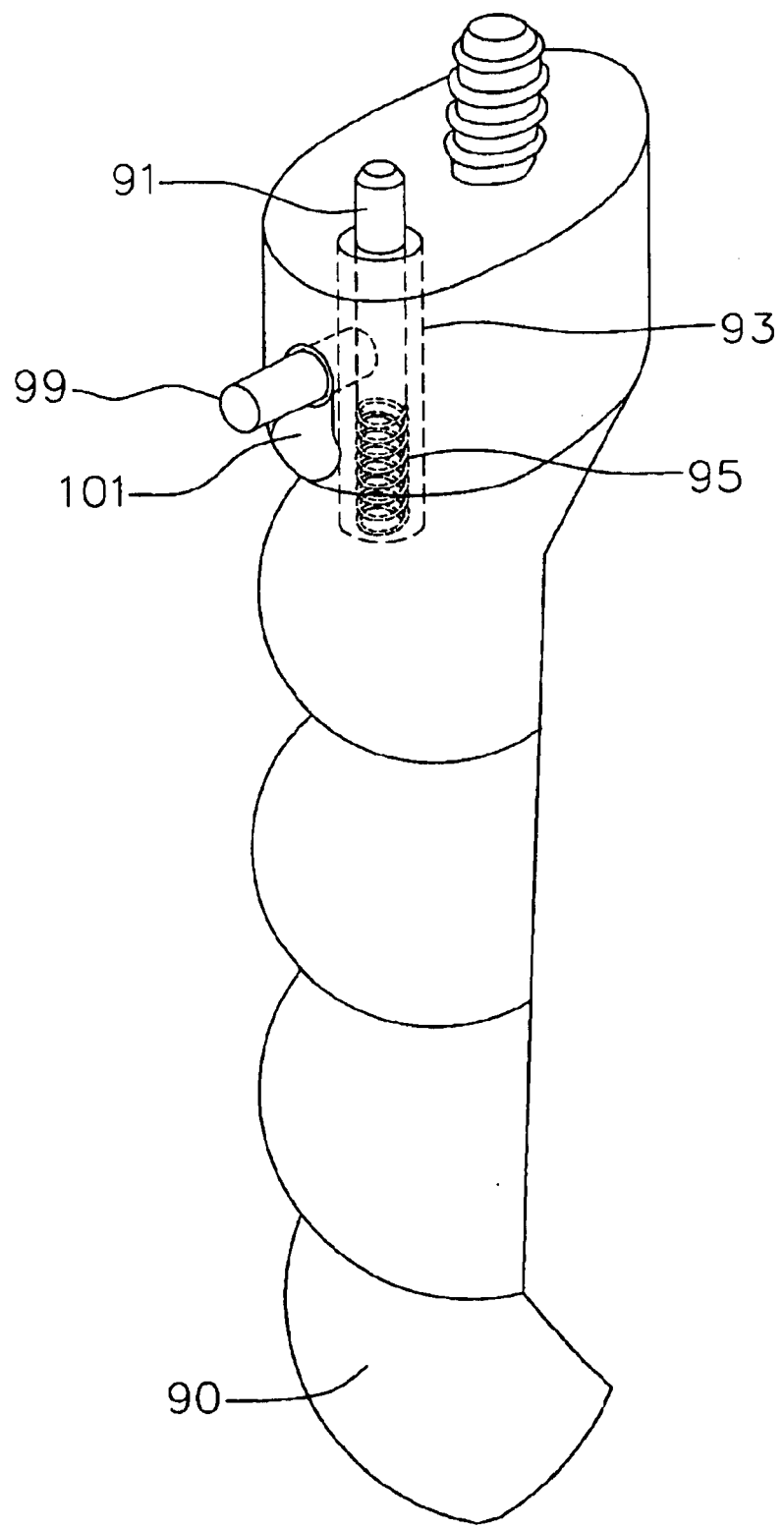
FIG. 5A is a detail perspective view of the handle of the stabilizer platform.

FIGS. 5 and 5A also illustrate the handle locking feature. Handle 90 has a locking pin 91 to lock the handle in position on the first section 84 of platform 80. Pin 91 is positioned in a vertical bore 93 located in handle 90 and is biased upwardly by a spring 95 positioned in the vertical bore below pin 91. The spring pushes the pin into a bore 97 located on a lower surface of the first section 84 to prevent the handle from rotating. Locking the handle to the platform assures the remote control signal will pass through infrared port 86. To release the handle from the first section, the pin is biased downwardly out of bore 97 by pushing down on a knob 99 extending horizontally from pin 91. Knob 99 extends out of the side of the handle through a horizontal bore 101 which extends into vertical bore 93. The locking mechanism can also be used in connection with the platform of FIG. 1. Although a pin and bore locking mechanism is shown it should also be understood that other mechanical locking mechanisms are contemplated by this invention to prevent the handle from rotating with respect to the platform.

As shown FIG. 7 a fiber optic tape 102 can be used in conjunction with camcorder 104 having an infrared receiving port 106 located on the front of the camcorder and not on the bottom of the camcorder. The combination of fiber optic tape 102 and camcorder 104 would be suitable for use with platform 80 as shown in FIG. 5 or a tripod (not shown). The fiber optic tape 102 has a backing layer or film 108. The backing layer or film has an adhesive coating 110 applied thereon and at least one optical fiber 112 is routed and bonded to the adhesive layer providing a continuous optical signal path from one end to the other of the tape. A releasable liner 114 is releasably attached to the adhesive layer and positioned to cover the backing layer including the optical fibers. The releasable layer 114 is removed so that the fiber optic tape can be positioned on the bottom surface 116 of camcorder 104 so that it can extend from a location adjacent the infrared port 86 in the stabilizer platform to the infrared receiving port 106 positioned on the front of camcorder 104. Therefore, fiber optic signals can be transmitted from the remote control 88 through infrared port 86 to the infrared receiving port 106. The fiber optic tape can have a port cutout 116 positioned at one end of the tape and a sending port area 118 at an opposite end of the tape. When the fiber optic tape is applied to the camcorder the sending port area 118 would be adjacent infrared receiving port 106 and port cutout 116 would be adjacent the infrared port 86 in the stabilizer platform 80.

The type of materials used for the fiber optic tape can vary depending upon the application. For instance, if a high durability is desired a polyester-type backing would be used. Considering the tape can be applied to curved surfaces of the camcorder, a flexible backing material would be chosen such as vinyl, polyurethane, polyamide, and polyester. Preferably the adhesive is any temporarily repositional adhesive. Temporarily repositional is meant such that the bond between the adhesive and the surface of the camcorder is such that the tape may be removed from the camera without damaging the camcorder either for a period of time or until the occurrence of a specified event which then could permanently adhere the tape to the camera. In a preferred embodiment, the adhesive is a pressure sensitive adhesive known in the industry as a standard class of materials. There are adhesives, which in dry form are aggressively and permanently tacky at room temperature and firmly adhere to a variety of similar surfaces upon mere contact without the need for more than manual pressure. The adhesive requires no activation by water, solvent or heat in order to exert a strong adhesive holding force towards such materials as paper, cellophane, glass, plastic, wood and metals. The adhesive has a sufficiently cohesive holding and elastic nature such that, despite its aggressive tackiness, can be handled with fingers and removed from smooth surfaces without leaving a substantial residue.

The optical fibers 112 can be any infrared transmitting material, such as silica or flexible glass or plastic FIG. 7 illustrates a plurality of fiber optic fibers embedded within the adhesive, the number will depend upon the size and shape of the individual fibers. It should be understood that depending upon the particular material, and its size, only one fiber optic fiber may be necessary to transmit the infrared signals to the infrared receiving port on the camcorder. Likewise, the fiber optic fiber can be constructed in the shape of a ribbon wherein adhesive can be applied directly to the ribbon thereby eliminating the need for the backing sheet or film. The fiber optic fiber then would be directly applied to the surface of the camcorder via the adhesive.

The stabilizing platform of the present invention allows the user to form a three-point support system wherein the platform rests on the user's shoulder, one hand holds the handle, while the upper arm is resting by the user's body. The stabilizer provides for relatively no movement of the camcorder because of the additional support provided and ease of operation through the remote control attached to the handle. Although the present invention has been described with respect to two embodiments thereof, it is to be understood that changes and modifications can be made therein which are within the intended scope of the invention as hereinafter claimed. For example, the handle can be manufactured so that the remote control is integral therewith, or the stabilizing bar can be folding or telescoped.

What is claimed is:

1. A camera stabilizer comprising:
   a platform having a first end connectable to a camera and a second end extending outwardly from the first end to rest on a shoulder of a camera operator;
   a handle locked to the platform having camera controls contained thereon; and
   means extending along an exterior surface of the platform for transmitting infrared camera control signals from the handle to a signal receiving port on the camera.

2. The stabilizer of claim 1, wherein the handle is locked to the platform by having a locking pin biased from the handle into a bore in the platform.

3. The stabilizer of claim 2, wherein the locking pin is at least partially positioned in a bore in the handle.

4. The stabilizer of claim 2, wherein the locking pin is biased by a spring.

5. The stabilizer of claim 4, wherein the spring is positioned in the bore below the locking pin.

6. The stabilizer of claim 2, wherein the locking pin includes a knob for manually moving the locking pin.

7. The stabilizer of claim 1, wherein the means for transmitting the camera control signals further includes a signal bore extending through the platform.

8. The stabilizer of claim 1, wherein the handle has a remote control containing the camera controls.

9. The stabilizer of claim 8, wherein the remote control is removably mounted on the handle.

10. The stabilizer of claim 1, wherein the means for transmitting camera control signals comprises a fiber optic fiber and an adhesive.

11. A camera platform comprising:
    a shoulder section;
    a camera section adjacent to the shoulder section for supporting a camera;
    a handle lockably attached to the camera section;
    a remote control removably attached to the handle; and
    a fiber optic fiber extending along an exterior surface of the camera section for transmitting infrared control signals from the remote control to a signal receiving port on the video camera.

12. The platform of claim 11, wherein the handle is lockably attached by a locking pin extending from the handle into the camera section.

13. The platform of claim 12, wherein the locking pin is biased by a spring.

14. The platform of claim 11, wherein the camera section has a signal bore extending therethrough, such that control signals generated by the remote control can pass through the signal bore.

15. The platform of claim 13, wherein the locking pin and the spring are positioned in a bore in the handle.

16. The platform of claim 13 wherein the locking pin includes a knob for disengaging the locking pin from the camera section.

17. A camera stabilizer comprising a platform having a fiber optic port extending therethrough, a fiber optic fiber extending through the fiber optic port and extending along an exterior surface of the platform to a signal receiving port on a camera positioned on the platform, and a handle having means for locking the handle to the platform.

18. The camera stabilizer of claim 17, wherein the means for locking the handle to the platform is a locking pin.

19. The camera stabilizer of claim 18, wherein the locking pin is biased into engagement with the platform.

20. The camera stabilizer of claim 18, wherein the locking pin includes a knob to disengage the locking pin from the plateform.

* * * * *